United States Patent
Haaf

(10) Patent No.: US 9,510,563 B2
(45) Date of Patent: Dec. 6, 2016

(54) CAT GROOMING PAD AND METHOD

(75) Inventor: David Haaf, San Rafael, CA (US)

(73) Assignee: Worldwise, Inc., Novato, CA (US)

( * ) Notice: Subject to any disclaimer, the term of this patent is extended or adjusted under 35 U.S.C. 154(b) by 1181 days.

(21) Appl. No.: 13/015,446

(22) Filed: Jan. 27, 2011

(65) Prior Publication Data

US 2012/0192802 A1    Aug. 2, 2012

(51) Int. Cl.
*A01K 15/02* (2006.01)
*A01K 13/00* (2006.01)

(52) U.S. Cl.
CPC ........... *A01K 13/002* (2013.01); *A01K 13/004* (2013.01)

(58) Field of Classification Search
CPC .................... A01K 15/024; A01K 13/004
USPC ................ 119/601, 702, 705, 706, 707, 708, 28.5,119/600, 611, 612, 621, 622
See application file for complete search history.

(56) References Cited

U.S. PATENT DOCUMENTS

| | | |
|---|---|---|
| 1,569,710 A | 1/1926 | Burt |
| 4,008,688 A | 2/1977 | Nicholas |
| 5,127,367 A | 7/1992 | Starowitz et al. |
| 5,197,411 A | 3/1993 | Schwarzenbart |
| 5,460,121 A * | 10/1995 | Udelle et al. .............. 119/600 |
| 5,515,811 A | 5/1996 | McAlister |
| 5,685,257 A | 11/1997 | Feibus |
| 5,724,911 A | 3/1998 | McAlister |
| 6,925,963 B2 | 8/2005 | Duffy et al. |
| D561,952 S * | 2/2008 | Lamstein et al. ............ D30/118 |
| 7,669,552 B2 | 3/2010 | Arvanites |
| D614,364 S * | 4/2010 | Kellogg et al. .............. D30/160 |
| D644,796 S * | 9/2011 | Haaf ............................ D30/160 |
| D644,797 S * | 9/2011 | Haaf ............................ D30/160 |
| D653,005 S * | 1/2012 | Haaf ............................ D30/160 |
| 2002/0108578 A1 | 8/2002 | Kosital |
| 2008/0202434 A1 | 8/2008 | Arnold |
| 2010/0143640 A1 | 6/2010 | Wilmsen |

* cited by examiner

*Primary Examiner* — Trinh Nguyen

(74) *Attorney, Agent, or Firm* — Bay Area Technology Law Group PC

(57) ABSTRACT

A pet grooming pad, used alone, or in conjunction with pet furniture for grooming a pet cat. The grooming pad is in the form of a mat having a bottom surface for residing upon a support and a top surface of a material capable of removing and trapping animal fur. The top surface can contain a second region as well, the second region being a grooming surface in the form of a plurality of flexible nodules.

6 Claims, 2 Drawing Sheets

CAT GROOMING PAD AND METHOD

TECHNICAL FIELD

The present invention involves a method of grooming a pet cat in the form of a mat having a surface capable of removing and trapping animal fur, alone, or with a grooming surface, the later in the form of flexible nodules. The need to groom a pet cat is well recognized and the present invention provides a unique surface from which to do so.

BACKGROUND OF THE INVENTION

It is quite important for the health and well being of a pet cat to provide proper grooming. Grooming is necessary for a cat's health and well being. Often times, cats try to clean themselves spending a good deal of time licking their fur and paws. However, external grooming is also highly recommended as grooming accomplishes much more than providing a healthy coat. It also stimulates circulation, removes loose hair and helps prevent matting.

Unfortunately, there have not been advances in the cat grooming field for quite some time. Most grooming devices are in the form of brushes which do not adequately retain cat fur and other debris resulting from the grooming process. In addition, cats do not find the bristles of the typical grooming brush to be particularly pleasing and, as a consequence, cats often times shy away from being groomed which, as noted above, can result in adverse health related issues.

It is thus an object of the present invention to provide a cat grooming method and pad for employing said method which cats will find enjoyable and thus employ even without the involvement of their owners.

These and further objects will be more readily appreciated when considering the following disclosure and appended claims

SUMMARY OF THE INVENTION

A pet grooming pad, used alone, or in conjunction with pet furniture for grooming a pet cat. The grooming pad is in the form of a mat having a bottom surface for residing upon a support and a top surface of a material capable of removing and trapping animal fur. The top surface can contain a second region as well, the second region being a grooming surface in the form of a plurality of flexible nodules.

DETAILED DESCRIPTION OF THE INVENTION

Figure 1:
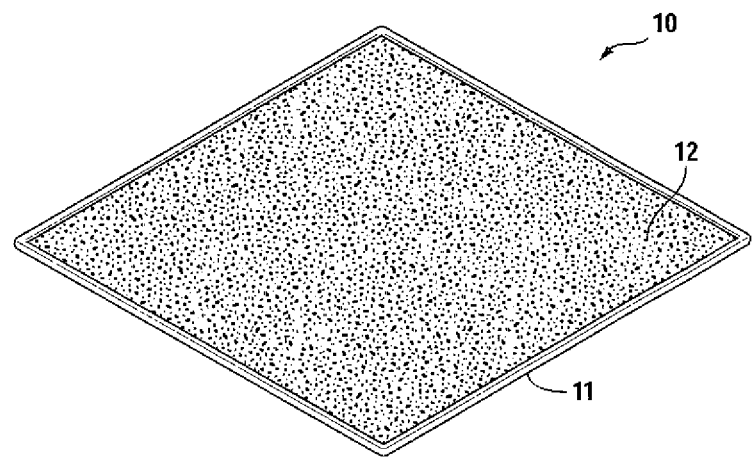
FIG. 1 is a perspective view of a first embodiment of the cat grooming pad of the present invention.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

The present invention can be most readily appreciated by first turning to FIG. 1 FIG. 1 depicts the basic cat grooming pad 10 of the present invention having bottom surface 11 and top surface 12, the latter composed of a material capable of removing and trapping animal fur. An excellent example of such material is directional microfiber. Generally, directional microfiber refers to synthetic fibers that measure less than one denier, the most common types being made from polyesters, polyamides such as nylon, Kevlar, Nomex and trogamide or a conjugation of polyester and polyamide. Being directional, the micro fiber will feel somewhat smooth when stroked in a first direction but resistant to movement when stroked in the opposite direction. This feature is important in realizing the attributes of the present invention. A second excellent example of a material useful in removing and trapping animal fur is a mat of unwoven fibers such as unwoven polyester fibers which are disclosed in U.S. Pat. No. 5,363,804, the disclosure of which is incorporated by reference herein. It is noted that such fibers are naturally electrostatic (cationic) and, thus, cat hair and dander tends to cling to this material.

When surface 12 of pad 10 is composed of directional microfiber, a cat, residing or rolling over the surface will appreciate its smooth supple feel in a first direction and a rougher resistant feel in the opposite direction. The latter attribute stimulates grooming while the microfiber can capture dander and loose hair resulting from the grooming exercise.

Figure 2:
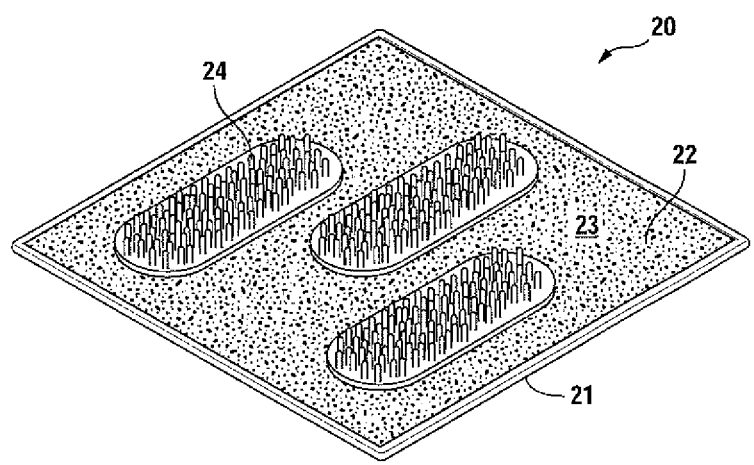
FIG. 2 is a perspective view of a second embodiment of the present invention.

As a second embodiment, reference is made to FIG. 2. In this instance, composite grooming pad 20 is again provided with bottom surface 21 for residing upon a support for maintaining composite grooming pad 20 and top surface 22 exposed to one's pet cat. The composite surface includes animal fur trapping material 23 which functions in a manner identical to surface 12 of FIG. 1. However, composite pad 20 further includes regions 24 in the form of a plurality of flexible nodules. Although the pliable nodules can take on a number of various configurations they are ideally composed of rubber or rubber-like cylindrically shaped elements which are a sufficient length to penetrate a cat's fur and yet be soft and pliable enough so as not to abrade the cat's skin for it to do so may encourage a cat to avoid the cat grooming and activity device, generally. Thermoplastic resin is an ideal material having nodules in the form of nubs consistent in size, shape, durometer and diameter. Alternatively, some of the nodules are of different sizes, shapes and/or diameters.

It has also been found that the combination of fur trapping material 23 and nodules 24 create a synergy ideally suited for cat grooming. Dander and loose hair that fall from the cat as a result of the cat rolling and lounging upon region 24 can be picked up and contained by material 23. Further, each region provides a different feel or stimulation to the cat thus increasing interest and maximizing sought after results. Dander, fur, dust and the like can easily be removed particularly from region 24 with the aid of an ordinary vacuum cleaner, tape or a moist cloth.

It is noted that both cat grooming pads 10 and 20 can be employed by simply allowing them to rest upon a horizontal surface. These pads can also be employed to increase the overall pet experience by situating the pads onto surfaces of pet furniture. As an example, reference is made to FIG. 3.

Figure 3:
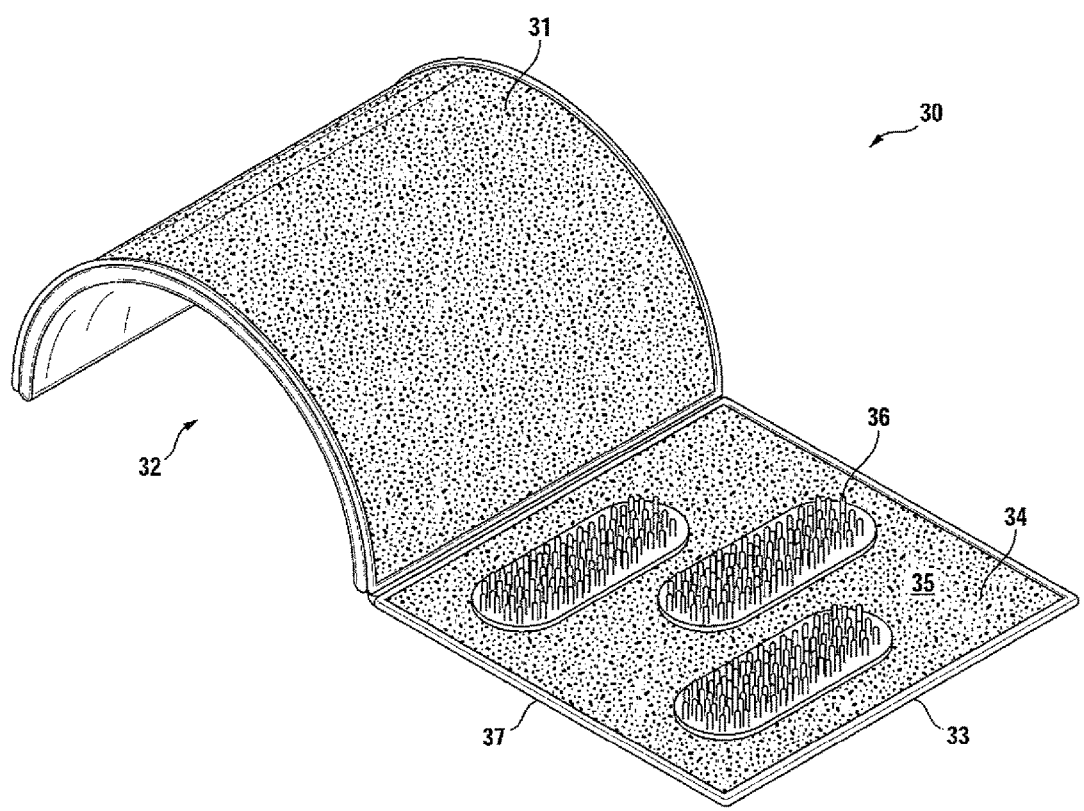
FIG. 3 is a perspective view of an article of pet furniture having the cat grooming pad selectively located thereon.

In turning to FIG. 3, furniture 30 is depicted which includes a tunnel portion 31 creating area 32 which cats oftentimes will use for privacy. Furniture 30 also includes planar extension 37 emanating from tunnel region 31. Cat grooming pad 33 can be placed upon planar extension 37, in this instance, pad 33 having top surface 34 including region 35 and flexible nodule regions 36. In its preferred embodiment, grooming pad 33 can be caused to simply reside upon planar extension 37 and be removable therefrom for cleaning and for enabling a pet owner to simply move the cat grooming pad to another location enabling the cat to use furniture 30 without any additional grooming feature. This not only expands the flexibility of pet furniture 30 but also of pad 33.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A pet grooming pad in the form of a mat comprising a top surface and a bottom surface, said top surface having first and second regions, said first region comprising directional microfiber a material capable of removing and trapping animal fur and said second region comprising a plurality of flexible nodules.

2. The pet grooming pad of claim 1 wherein said material capable of removing and trapping animal fur comprises unwoven fibers.

3. The pet grooming pad of claim 2 wherein said unwoven fibers comprise unwoven polyester fibers.

4. The pet grooming pad of claim 1 wherein said flexible nodules comprise a thermoplastic resin.

5. The pet grooming pad of claim 1 wherein each of said nodules are of a constant size, shape, diameter and durometer.

6. The pet grooming pad of claim 5 wherein some of said nodules are of different sizes, shapes or diameters of other of said nodules.

* * * * *